United States Patent
He

(10) Patent No.: US 7,463,954 B1
(45) Date of Patent: Dec. 9, 2008

(54) TERRAIN AUGMENTED DISPLAY SYMBOLOGY

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 376 days.

(21) Appl. No.: 10/998,408

(22) Filed: Nov. 29, 2004

(51) Int. Cl.
    *G01C 23/00* (2006.01)
(52) U.S. Cl. .................. 701/3; 701/4; 701/8; 701/9; 701/14; 701/301; 340/979; 340/980
(58) Field of Classification Search ............ 701/1, 701/3, 4, 8, 9, 14, 300, 301; 340/905, 958, 340/959, 972, 979, 980
    See application file for complete search history.

(56) References Cited

U.S. PATENT DOCUMENTS

| | | | |
|---|---|---|---|
| 4,368,517 A | 1/1983 | Lovering | 364/428 |
| 5,343,395 A * | 8/1994 | Watts | 701/16 |
| 5,745,863 A | 4/1998 | Uhlenhop et al. | 701/14 |
| 6,653,947 B2 | 11/2003 | Dwyer et al. | 340/970 |
| 6,678,588 B2 | 1/2004 | He | 701/3 |
| 6,738,011 B1 * | 5/2004 | Evans | 342/26 C |
| 6,782,312 B2 | 8/2004 | He | 701/3 |
| 2002/0123830 A1 | 9/2002 | Cundiff | 701/3 |
| 2004/0183696 A1 * | 9/2004 | Low | 340/945 |
| 2004/0225420 A1 | 11/2004 | Morizet et al. | 701/3 |
| 2005/0099433 A1 * | 5/2005 | Berson et al. | 345/619 |
| 2005/0206533 A1 | 9/2005 | Rogers et al. | 340/979 |

OTHER PUBLICATIONS

Kramer, Lynda J., et al., "Pathway Design Effects on Syntetic Vision Head-up-Displays" printed Sep. 27, 2004 from http://techreports.larc.nasa.gov/ltrs/PDF/2004/mtg/NASA-2004-dss-ljk.pdf.
Newman, Richard L., "HUDs, HMDs, and SDO: A Problem or a Bad Reputation," Presented at Recent Trends in Special Disorientation Conference, Nov. 2000, TN-00-18.
Honeywell, "HUD 2020 Head-Up Display System," Keeping pilots' focus on the outside world, Sep. 1998.
European Search Report EP 06111021.9 dated Jan. 9, 2006.

* cited by examiner

*Primary Examiner*—Gertrude Arthur Jeangla
(74) *Attorney, Agent, or Firm*—Ingrassia, Fisher & Lorenz, P.C.

(57) ABSTRACT

Terrain augmented display symbology improves a pilot's spatial awareness during aircraft approach and landing. The symbology includes a terrain-tracing, three-dimensional centerline that provides a visual cue of terrain elevations along an approach course to a runway. Additionally, the symbology includes terrain-tracing, three-dimensional lateral deviation marks representing deviations from the centerline. The symbology also includes an aircraft symbol shaped like an airplane and pointing towards the direction of travel. The pilot may be able to quickly interpret the terrain augmented display symbology and take actions based on the surrounding terrain elevation.

25 Claims, 6 Drawing Sheets

TERRAIN AUGMENTED DISPLAY SYMBOLOGY

FIELD

The present invention relates generally to display symbology, and more particularly, relates to terrain augmented display symbology.

BACKGROUND

A pilot uses flight instruments and associated displays to navigate an aircraft. The easier it is for the pilot to obtain and understand the information provided by these instruments and displays, the more likely that the pilot will be able to successfully navigate the aircraft. This is especially true during approach and landing on a runway.

Currently, instrument landing systems (ILS), microwave landing systems (MLS), or satellite landing systems (SLS) are used to guide aircraft during landing. These systems typically use a deviation bar on a horizontal indicator to indicate lateral deviation from the approach course and a glide scope indicator to indicate vertical deviation from the glide scope. The deviation bar and the glide scope indicator provide flight path deviation information to the pilot, allowing the pilot to make flight path corrections while landing.

Because looking at the horizontal indicator causes the pilot to look away from the cockpit window, some aircraft have incorporated a head-up display. The head-up display projects symbology representing the deviation bar and glide scope indicator onto a screen integrated into the cockpit window, so that the pilot can simultaneously view both the symbology and conditions outside the cockpit. This solution improves safety because the pilot can continue to monitor the situational progress of the flight while obtaining flight data. In addition, pilot fatigue is reduced by reducing the number of instruments needing to be scanned.

Initially, the symbology used on the head-up display to represent the information previously provided by the horizontal indicator was not intuitive. The pilot had to be trained to understand what data the symbology represented and how to interpret the data. By making the symbology more intuitive, aircraft navigation is simplified, pilot error and fatigue is reduced, and safety is increased.

An improvement to symbology format is addressed in U.S. Pat. No. 5,745,863 titled "Three Dimensional Lateral Displacement Display Symbology Which Is Conformal To The Earth," which is assigned to the same assignee as the present invention and is hereby incorporated by reference in its entirety. U.S. Pat. No. 5,745,863 describes using two-dimensional lines to depict an extended course centerline, which extends towards a vanishing point near a horizon line on the display, and two-dimensional deviation marks on either side of an aircraft symbol.

While U.S. Pat. No. 5,745,863 describes some improvements regarding display symbology, additional improvements can be made. These additional improvements may further simplify aircraft navigation, reduce pilot error and fatigue, and increase safety.

SUMMARY

A system and method for providing terrain augmented display symbology is described. The symbology includes a terrain-tracing centerline that provides a visual cue of terrain elevations along an approach course to a runway. The symbology also includes terrain-tracing lateral deviation marks representing deviations from the centerline. An aircraft symbol shaped like an airplane may also be used to indicate the direction of flight.

A graphics processor receives data from a variety of sources including avionic systems and a terrain database. The terrain database includes elevation data that corresponds to geographic coordinates. The graphics processor uses the data received from the avionics systems and the terrain database and generates the symbology. The symbology is then displayed on a screen, such as the screen in a head-up display or a heads-down display with synthetic terrain image background.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
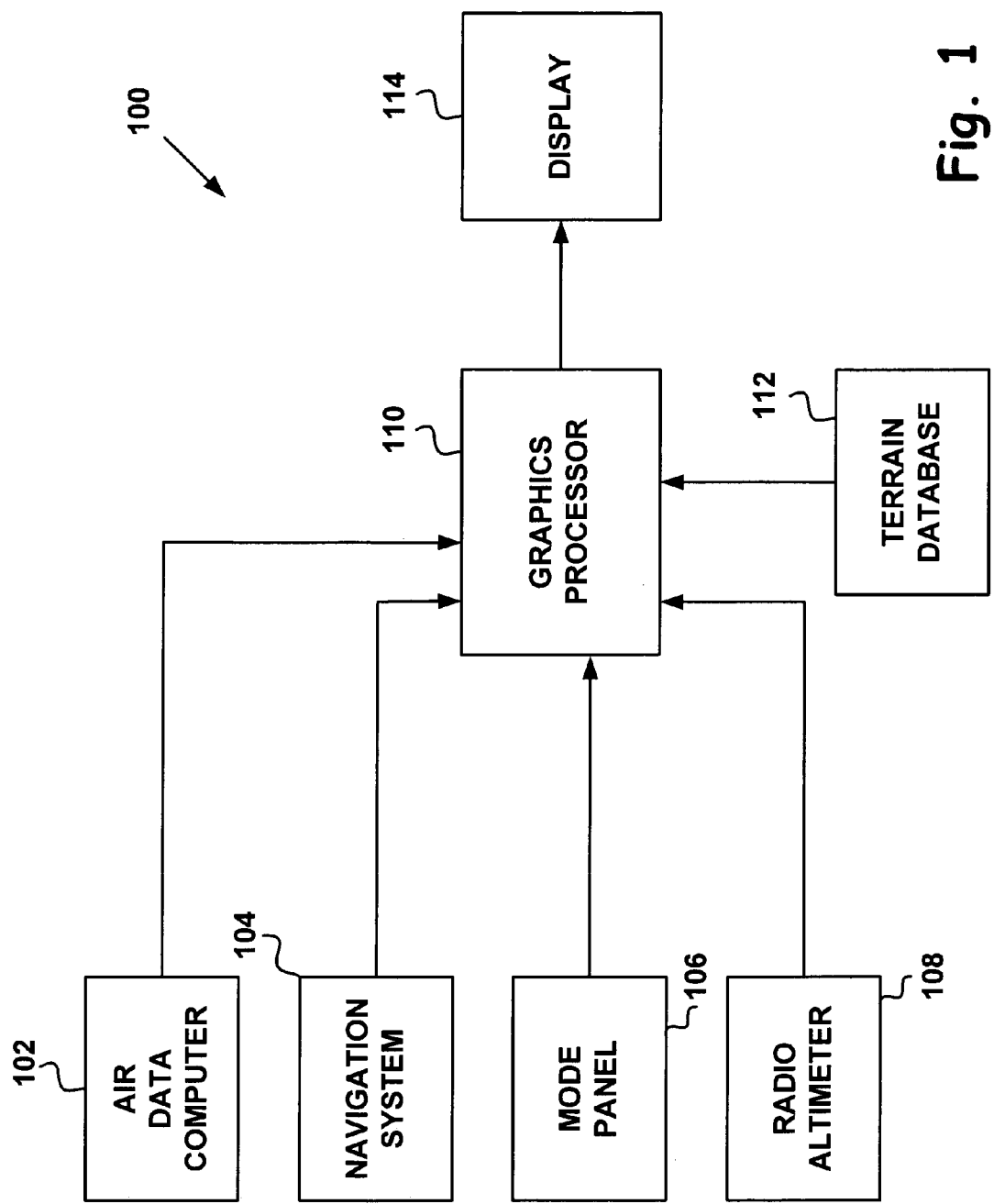
FIG. 1 is a block diagram of a flight system, according to an example.

FIG. 1 is a block diagram of a flight system 100. The flight system 100 includes a variety of avionic systems, including an air data computer 102, a navigation system 104, a mode panel 106, and a radio altimeter 108. These, as well as other avionic systems, may provide data to a graphics processor 110. For example, the air data computer 102 may provide barometric altitude, the navigation system 104 may provide glide slope deviation, the mode panel 106 may provide glide path angle and other runway information, and the radio altimeter 108 may provide radio altitude to the graphics processor 110. Additionally, the graphics processor 110 may receive data from a variety of other sources, including a terrain database 112. The terrain database 112 includes elevation data that corresponds to geographic coordinates.

The graphics processor 110 may generate the symbology described herein using techniques substantially the same as prior art symbols, such as a runway symbol. Based on the data received, the graphics processor 110 controls what is displayed on a display 114. In a preferred embodiment, the display 114 is a heads-down or a head-up display. However, other displays now known or developed in the future may be used. For example, the display 114 may be a helmet mounted display.

In an aircraft using a head-up display, the screen of the display 114 is incorporated into the cockpit window of an aircraft. Thus, the pilot is able to view the symbology on the screen while monitoring conditions outside the aircraft. In a heads-down display, synthetic terrain images are used on a background in which flight symbology are displayed as schematic overlays.

Figure 2:
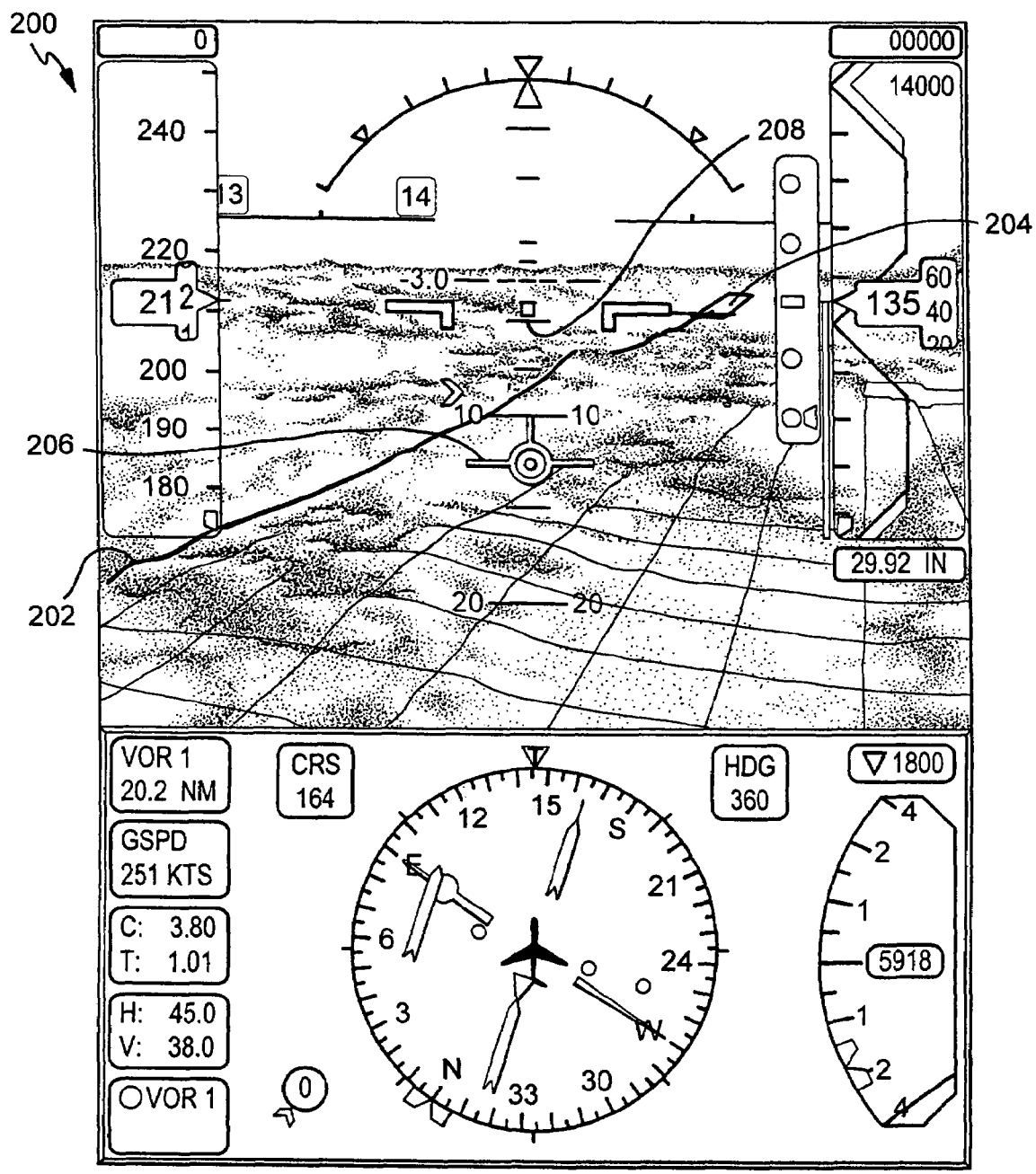
FIG. 2 illustrates a flight display, according to an example.

FIG. 2 illustrates a flight display 200. The flight display 200 includes example terrain augmented display symbology generated by the graphics processor 110. The flight display 200 depicts a centerline 202 ending at a runway 204. The centerline 202 is a symbolic guide used by the pilot to adjust the aircraft's flight path during the approach to the runway 204.

Also shown in FIG. 2 is a flight path marker 206, which is a primary guidance cue for aircraft controls and for turning and aligning with the runway 204. The flight path marker 206 depicts the current position of the aircraft in relationship to the centerline 202. FIG. 2 also depicts an aircraft symbol 208 which may be used by the pilot to monitor aircraft roll conditions. Additional flight information may also be depicted on the flight display 200.

The centerline 202 is a terrain-tracing, three-dimensional extended runway centerline. In some instances, the presence of terrain and other sensitive areas requires an approach course line that differs from the runway centerline. The centerline 202 traces the terrain surface, which provides the pilot with more guidance than a two-dimensional (i.e., straight line) centerline. As a result, the pilot can more easily plan course adjustments during approach to the runway 204 based on the terrain elevation. For example, the pilot may adjust the course of the aircraft so as to avoid a mountain peak upon approach to the runway 204.

The centerline 202 may be calculated using runway position data and terrain data located in the terrain database 112. More specifically, the centerline 202 may be generated by computing lateral line coordinates extended from a runway end point along the runway 204 direction or along the direction of a selected approach course. The runway position data may be obtained from an on-board navigation database and/or from a data link. The computed lateral line coordinates may then be used to obtain corresponding elevation data, which may be obtained from the terrain database 112.

Figure 3:
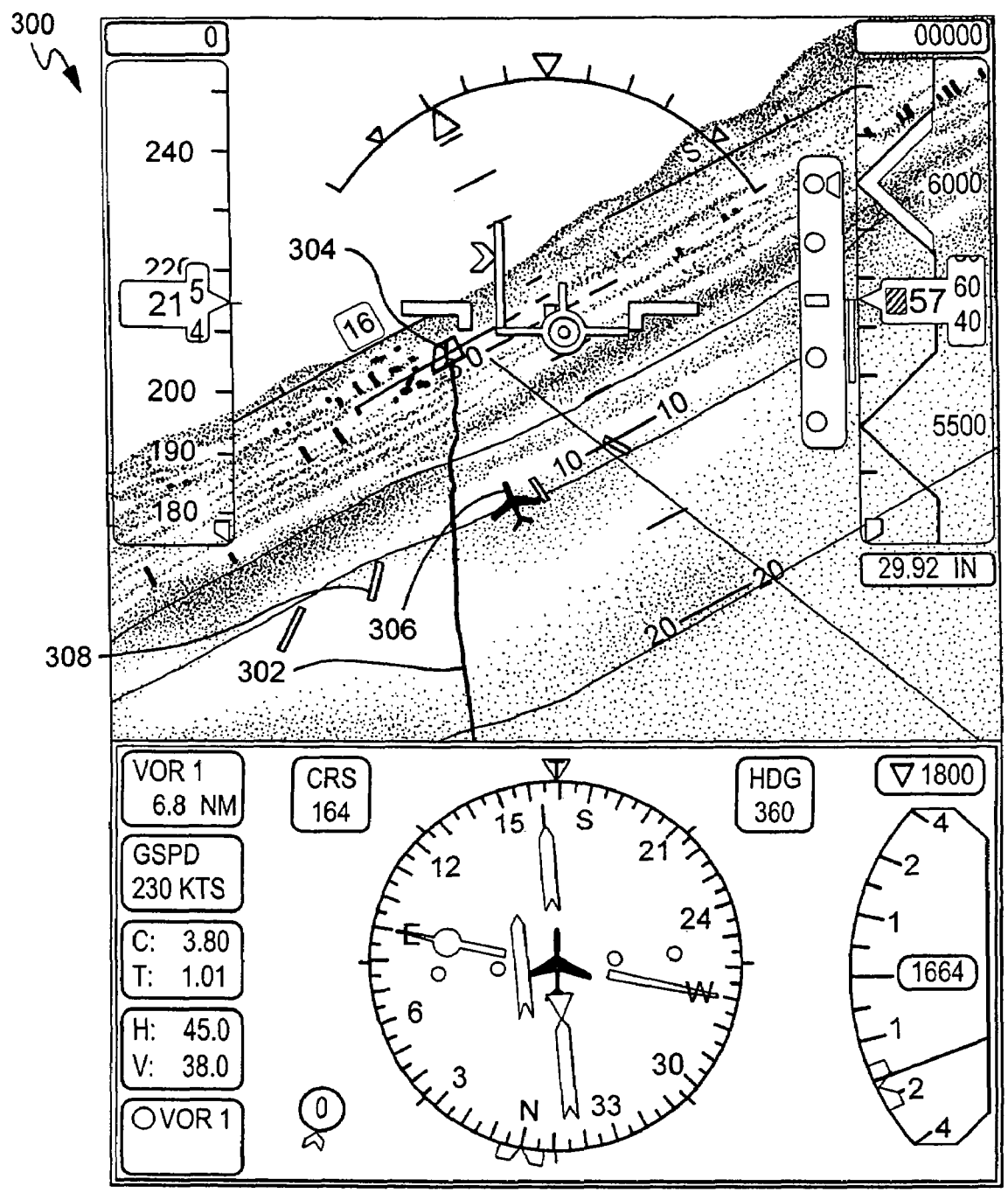
FIG. 3 illustrates a flight display, according to another example.

FIG. 3 illustrates a flight display 300. The flight display 300 includes additional terrain augmented display symbology generated by the graphics processor 110. The flight display 300 depicts a centerline 302 ending at a runway 304. The centerline 302 is similar to the centerline 202 depicted in FIG. 2, but located on different terrain.

Also shown in FIG. 3 is an aircraft symbol 306 shaped like an airplane. Additionally, terrain-tracing, three-dimensional, lateral deviation marks 308 are depicted on the flight display 300. While four lateral deviation marks 308 are depicted in FIG. 3, more or less than four lateral deviation marks may be used. Both the aircraft symbol 306 and the lateral deviation marks 308 point towards an ILS source location (i.e., an ILS beacon located at an endpoint of a runway) providing the pilot with direction information via guidance symbology that can be understood intuitively. Additional flight information may also be depicted on the flight display 300.

The lateral deviation marks 308 are lateral deviation indicators used to provide additional visual cues for determining terrain and deviation line closure rate. The lateral deviation marks 308 are used to represent both present deviations from the centerline 302 and direction of aircraft movement. Thus, the lateral deviation marks 308 provide a visual guide for closure rate to the centerline 302 allowing the pilot to more easily align the aircraft with the runway 304.

The graphics processor 110 generates the lateral deviation marks 308 based on current aircraft parameters obtained from the navigation system 104 and/or other avionic systems. The lateral deviation marks 308 may be generated by computing terrain-tracing projection lines at a number of fixed angles matching an emission beam pattern of the runway ILS beacon. Sections of the terrain-tracing lines in the forward looking perspective display view may be used to generate the lateral deviation marks 308.

The lateral deviation marks 308 are depicted in FIG. 3 as being centered about the centerline 302. The lateral deviation marks 308 may be located at a predetermined distance from the centerline 302. For example, the lateral deviation marks 308 located closest to the centerline 302 may be displayed one degree of deviation from the centerline 302, while the next closest lateral deviation marks 308 may be two degrees of deviation from the centerline 302 as measured from the runway beacon beam location. Other predetermined distances, such as a fixed distance (e.g., 1000 feet) may be used for rendering the lateral deviation marks 308 with respect to the centerline 302.

Figure 4:
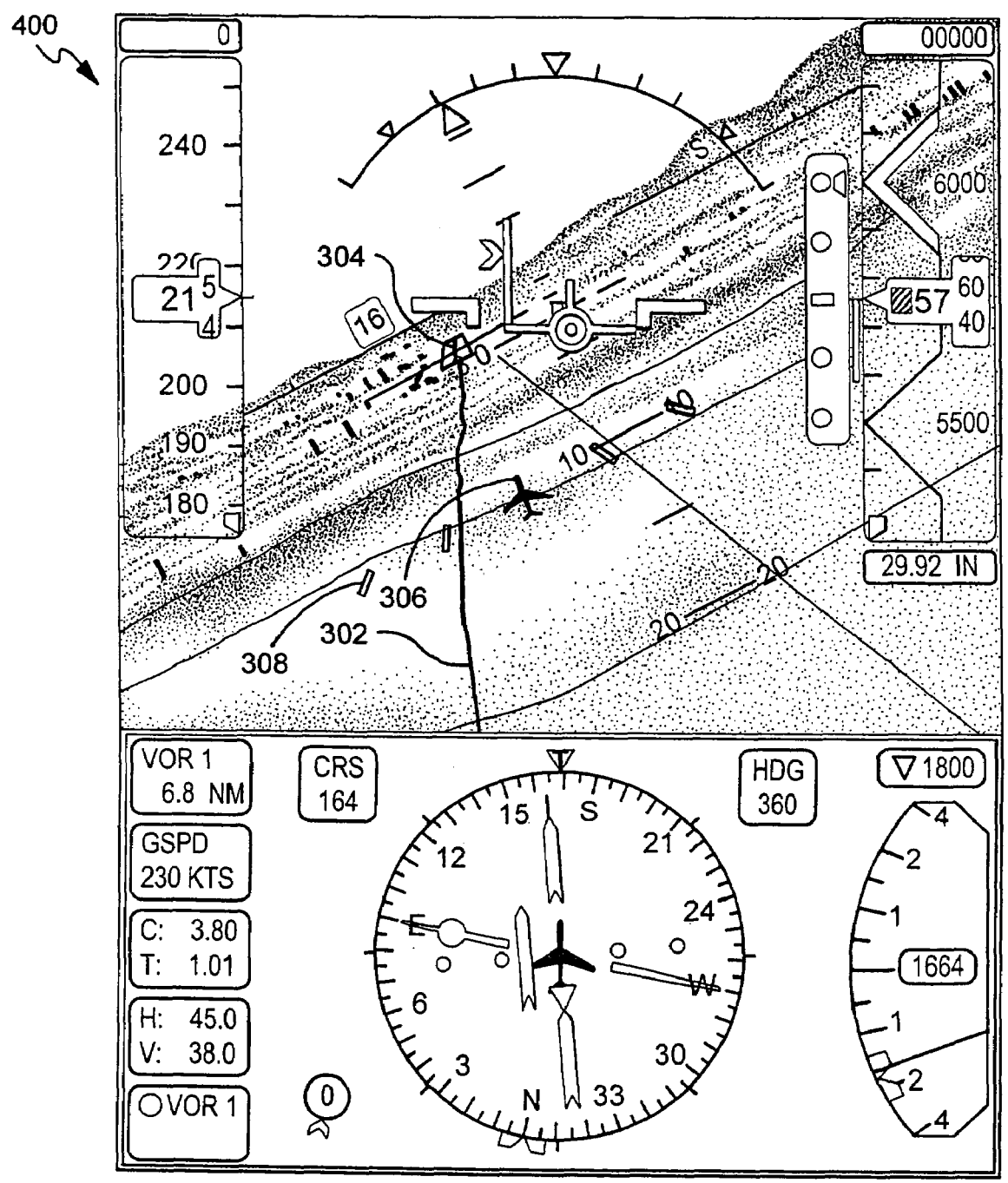
FIG. 4 illustrates a flight display, according to another example.

The lateral deviation marks 308 may also be centered about the aircraft symbol 306 as seen in flight display 400 depicted in FIG. 4. The pilot may be able to choose the formatting of the symbology to be centerline centered or aircraft centered based on personal preference and/or current flight conditions. Generally, one mode is selected by the pilot during a landing.

Figure 5:
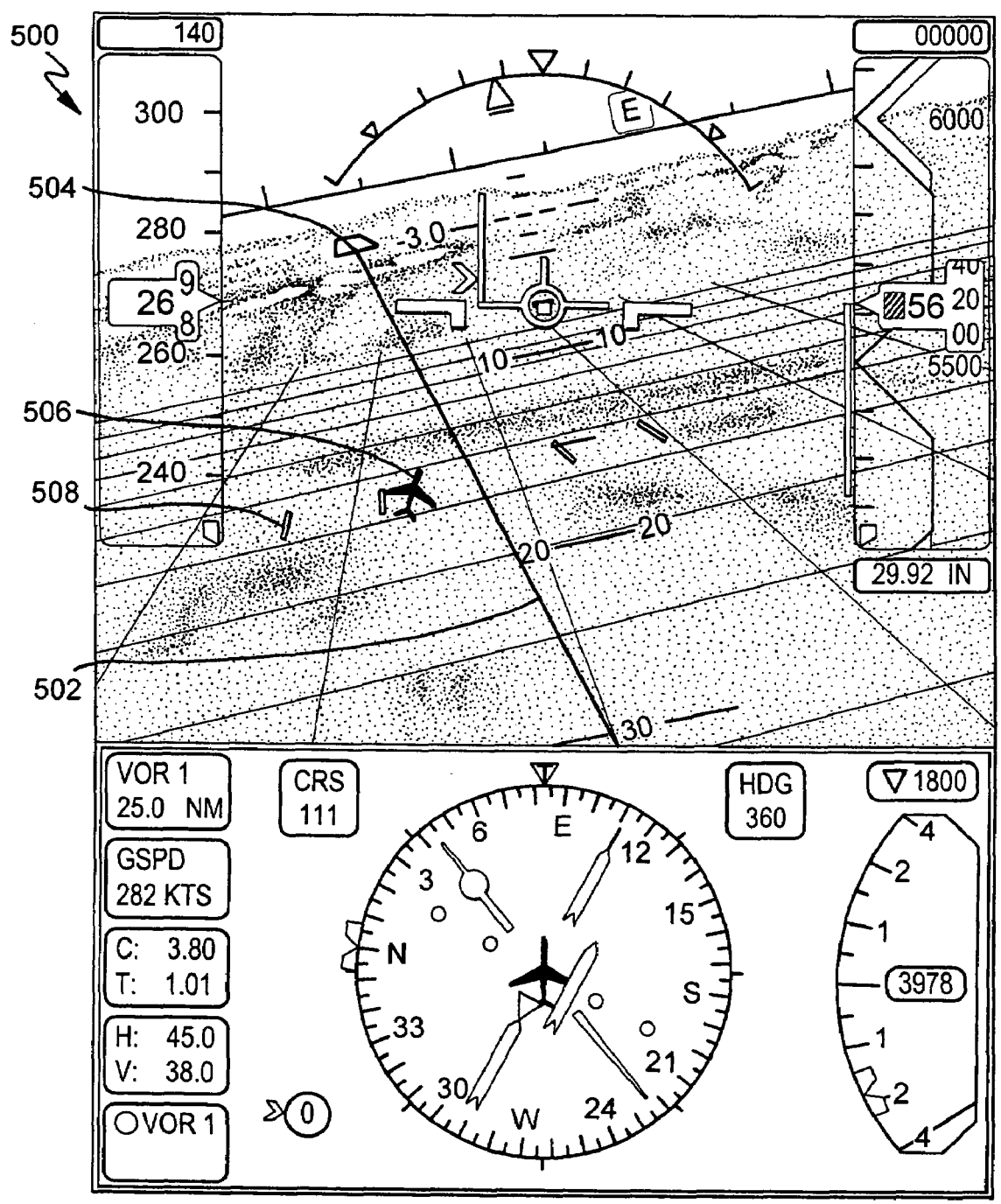
FIG. 5 illustrates a flight display, according to another example.

FIG. 5 illustrates a flight display 500. The flight display 500 is another example of terrain augmented display symbology generated by the graphics processor 110. The flight display 500 depicts a centerline 502 ending at a runway 504. In addition, the flight display 500 depicts an aircraft symbol 506 and lateral deviation marks 508.

The flight display 500 depicts an image that may be generated when an ILS signal is not available. In this scenario, deviation scales and the aircraft's position may be determined using data from a Flight Management System (FMS) and runway data. An aircraft symbol 506 provides a visual cue of the aircraft's current track and/or heading. Once the ILS becomes available, the graphics processor 110 may transition to providing deviation measurements using the ILS.

Figure 6:
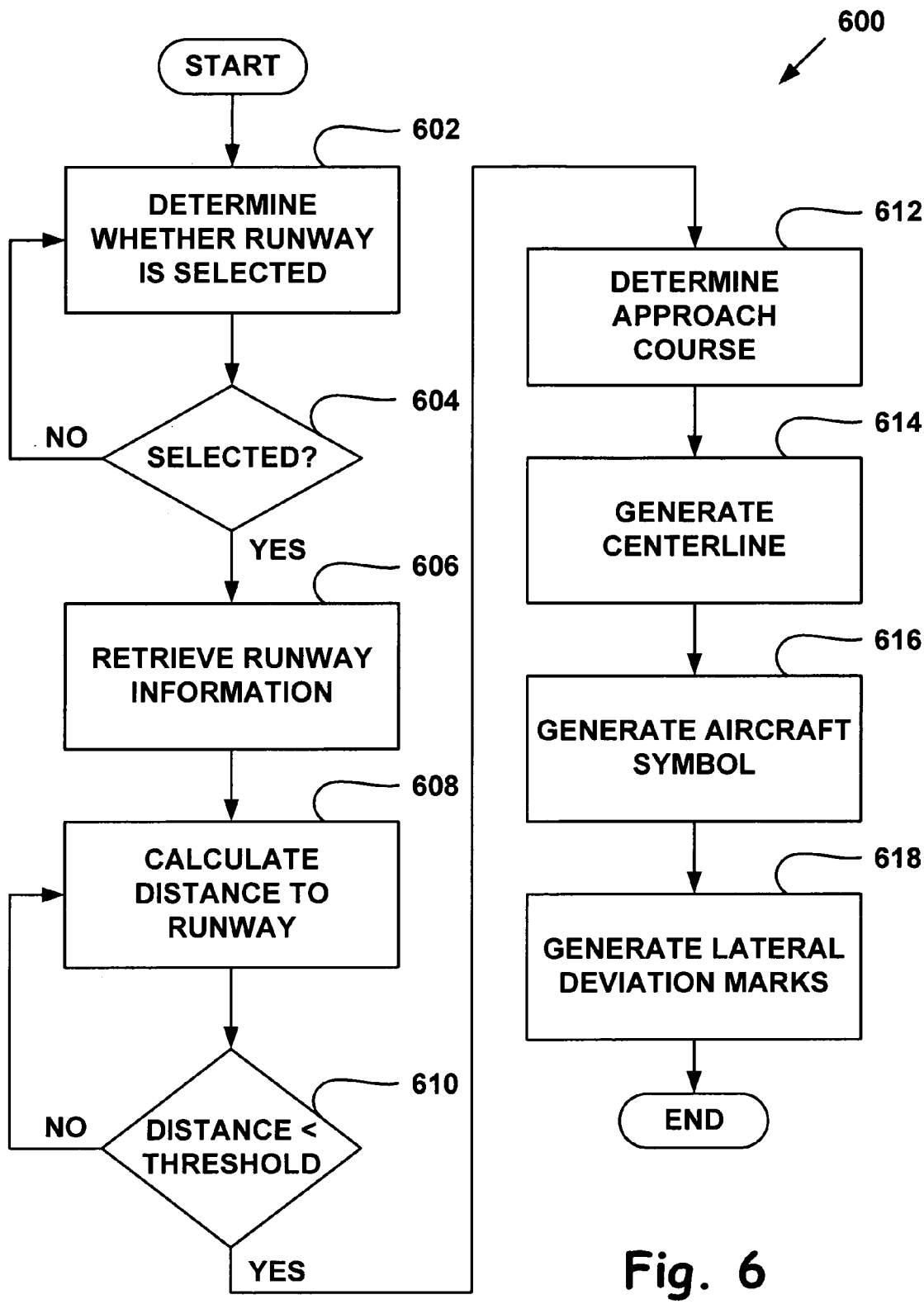
FIG. 6 is a flow diagram depicting a method for providing terrain augmented display symbology, according to an example.

FIG. 6 is a flow diagram 600 depicting a method for providing terrain augmented display symbology. At block 602, a determination is made as to whether a runway is selected for approach and landing. The graphics processor 110 may check an FMS flight plan and/or receive input directly from the pilot to determine if a runway is selected. At block 604, if a runway has not been selected, the method returns to block 602 to determine whether a runway is now selected.

If a runway has been selected, at block 606, runway information regarding the selected runway is obtained. The graphics processor 110 may obtain runway information from an on-board FMS database and/or via a data link. The runway information includes the size and position of the selected runway. Additional information regarding the runway may also be available.

At block 608, the distance from the aircraft to the selected runway is calculated. The graphics processor 110 calculates the distance using the runway information obtained at block 606 and the current position of the aircraft. The current position of the aircraft may be obtained from the ILS or FMS. When the ILS signal is available, the current aircraft position may be calculated by using lateral (angle) deviation data obtained from the avionic systems 102-108. Without the ILS signal, the current aircraft position may be determined by the FMS and/or GPS.

At block 610, the distance to the runway is compared to a threshold value for determining whether to display approach symbology. The threshold value may be a predetermined value used to identify at what distance the pilot should start receiving approach information. The threshold value may be based on the selected runway and approach direction. For example, the pilot should not receive the approach symbology too soon as the symbology may distract the pilot from more immediate flight concerns. However, the pilot should receive the approach symbology soon enough to plan and implement a safe landing on the selected runway.

If the distance to the runway is greater than the threshold value, then the method returns to block 608 to determine whether the distance to the runway is now less than the threshold value. Otherwise, at block 612, an approach course to the runway is determined. The approach course and direction may be calculated based on ILS beam direction, runway direction, and/or final approach procedure direction.

At block 614, a terrain-tracing centerline is generated along the approach course determined at block 612. The graphics processor 110 generates a terrain-tracing centerline by first computing lateral coordinates along the centerline and then retrieving terrain elevation data from the terrain database 112 based on the coordinates. The terrain-tracing centerline may be displayed in a color that is visible on the rendered terrain background.

At block 616, an aircraft symbol is generated. The aircraft symbol may be rendered in two modes. In a first mode, the aircraft symbol may be oriented to indicate current track position. In a second mode, the aircraft symbol may be oriented to indicate both current track position and the direction of travel. In the second mode, the aircraft symbol may point towards the ILS beam location. In both the first and second mode, the aircraft symbol provides aircraft position information with respect to the centerline.

The aircraft symbol may be rendered in a color that can easily be seen by the pilot with respect to the rendered background terrain. The color of the aircraft symbol may also indicate ILS signal or FMS position based operation.

At block 618, lateral deviation marks are generated. The lateral deviation marks may be computed based on angle emission lines from the ILS beam location and terrain elevation data from the terrain database 112. A small segment of the emission lines may be used to generate the lateral deviation marks.

The lateral deviation marks may be rendered in a color that can easily be seen by the pilot with respect to the rendered background terrain. The color of the lateral deviation marks may also indicate ILS signal or FMS position based operation. Further, the lateral deviation marks may be rendered so that they are centered about the centerline symbol or centered about the aircraft symbol.

Terrain augmented conformal lateral deviation display symbology improves a pilot's spatial awareness during aircraft approach and landing. The pilot may be able to quickly interpret the symbology and take actions based on the elevation of the surrounding terrain. As a result, aircraft navigation may be simplified, pilot error and fatigue may be reduced, and safety may be increased.

It should be understood that the illustrated embodiments are examples only and should not be taken as limiting the scope of the present invention. For example, while ILS was used to describe the invention, the symbology may also be used with MLS and SLS systems. The claims should not be read as limited to the described order or elements unless stated to that effect. Therefore, all embodiments that come within the scope and spirit of the following claims and equivalents thereto are claimed as the invention.

I claim:

1. A navigation display system, comprising:
    a graphics processor for receiving data and providing an output including symbology that is displayed on a screen, wherein the symbology includes a terrain-tracing centerline providing a visual cue of terrain elevations along an approach course to a runway.

2. The system of claim 1, wherein the screen is a component of a head-up display.

3. The system of claim 1, wherein the screen is a component of a heads-down display.

4. The system of claim 1, further including a terrain database.

5. The system of claim 4, wherein the centerline is generated by computing lateral line coordinates along the approach course to a runway endpoint and obtaining corresponding elevation data from the terrain database.

6. The system of claim 1, wherein the symbology further includes at least two terrain-tracing lateral deviation marks.

7. The system of claim 6, wherein the lateral deviation marks point towards an end of the runway.

8. The system of claim 6, wherein the lateral deviation marks represent a deviation from the centerline.

9. The system of claim 6, wherein the lateral deviation marks are centered about the centerline.

10. The system of claim 1, wherein the symbology further includes an aircraft symbol shaped like an airplane.

11. The system of claim 10, wherein the aircraft symbol points towards an end of the runway.

12. The system of claim 10, wherein lateral deviation marks are centered about the aircraft symbol.

13. A navigation display system, comprising in combination:
    a screen for displaying data; and
    a graphics processor for receiving data and providing an output including symbology that is displayed on the screen, wherein the symbology includes a terrain-tracing centerline providing a visual cue of terrain elevations along an approach course to a runway, at least two terrain-tracing lateral deviation marks representing deviations from the centerline, and an aircraft symbol shaped like an airplane.

14. A method for providing terrain augmented conformal lateral deviation display symbology, comprising in combination:
    determining an approach course to a runway;
    generating a terrain-tracing centerline symbol along the approach course; and
    displaying the centerline symbol on a screen, wherein the centerline symbol provides a visual cue of terrain elevations along the approach course to the runway.

15. The method of claim 14, wherein generating the terrain-tracing centerline symbol includes computing lateral line coordinates along the approach course and retrieving terrain elevation data corresponding to the coordinates.

16. The method of claim 14, further including generating an aircraft symbol.

17. The method of claim 16, further including displaying the aircraft symbol on the screen providing aircraft position information.

18. The method of claim 17, wherein the aircraft symbol further provides a direction of travel.

19. The method of claim 16, further including generating at least two lateral deviation marks.

20. The method of claim 19, wherein generating the lateral deviation marks includes computing terrain-tracing projection lines at a number of fixed angles matching an emission beam pattern from a runway beacon.

21. The method of claim 19, further including displaying the lateral deviation marks on the screen so that the lateral deviation marks are centered about the centerline symbol.

22. The method of claim 19, further including displaying the lateral deviation marks on the screen so that the lateral deviation marks are centered about the aircraft symbol.

23. The method of claim 14, wherein the centerline symbol is displayed on the screen if a runway is selected and an aircraft's distance to the runway is less than a threshold value.

24. The method of claim 14, wherein the screen is a component of a head-up display.

25. The method of claim 14, wherein the screen is a component of a heads-down display.

* * * * *